(No Model.)　　　　　　　　　　J. RUSSELL.　　　　　7 Sheets—Sheet 2.
MACHINE FOR MAKING TIMBER HANGERS.

No. 445,007.　　　　　　　　　　　　　Patented Jan. 20, 1891.

Fig. 2.

WITNESSES:　　　　　　　　　　　　　　　　　INVENTOR:
　　　　　　　　　　　　　　　　　　　　　　Jacob Russell
John S. Clark.　　　　　　　　　　　　　　BY Henry Connett
　　　　　　　　　　　　　　　　　　　　　　　　ATTORNEY.

(No Model.) 7 Sheets—Sheet 3.

J. RUSSELL.
MACHINE FOR MAKING TIMBER HANGERS.

No. 445,007. Patented Jan. 20, 1891.

Fig. 3.

WITNESSES:
INVENTOR: Jacob Russell,
BY Henry Connett
ATTORNEY (No Model.) 7 Sheets—Sheet 4.

J. RUSSELL.
MACHINE FOR MAKING TIMBER HANGERS.

No. 445,007. Patented Jan. 20, 1891.

WITNESSES: INVENTOR:
Jacob Russell
BY Henry Connett
ATTORNEY.

(No Model.)  7 Sheets—Sheet 5.
J. RUSSELL.
MACHINE FOR MAKING TIMBER HANGERS.
No. 445,007. Patented Jan. 20, 1891.

WITNESSES:

INVENTOR:
Jacob Russell.
BY
Henry Connett
ATTORNEY.

(No Model.) 7 Sheets—Sheet 6.

J. RUSSELL.
MACHINE FOR MAKING TIMBER HANGERS.

No. 445,007. Patented Jan. 20, 1891.

WITNESSES:

INVENTOR:
Jacob Russell
BY
ATTORNEY.

UNITED STATES PATENT OFFICE.

JACOB RUSSELL, OF BROOKLYN, NEW YORK.

MACHINE FOR MAKING TIMBER-HANGERS.

SPECIFICATION forming part of Letters Patent No. 445,007, dated January 20, 1891.

Application filed May 2, 1890. Serial No. 350,298. (No model.)

*To all whom it may concern:*

Be it known that I, JACOB RUSSELL, a citizen of the United States, residing at Brooklyn, Kings county, New York, have invented certain Improvements in Machines for Making Timber-Hangers and Similar Articles, of which the following is a specification.

My invention relates to that class of machines which are designed to make at one operation a "bridle-iron" or timber-hanger from a bar of hot iron of the proper length and dimensions.

These timber-hangers are of two classes, single and double, and, so far as I am aware, double timber-hangers have never before been made on a machine, the usual practice in this respect being to make two single hangers and weld them together. This is an expensive practice; and the object of my present invention is to construct a machine that will make a double timber-hanger at one operation, except as to the butt weld required to unite the ends of the bar. At the same time the machine is adapted for making perfect single timber-hangers without the necessity of shifting or changing the mechanism in any manner.

In the accompanying drawings, which serve to illustrate my invention.

In my patent, No. 359,099, dated May 8, 1887, I described a machine for making single timber-hangers and fully illustrated one of these hangers therein. Therefore no further description of the latter will be required.

Figures 11, 12, 13, 14, 15:
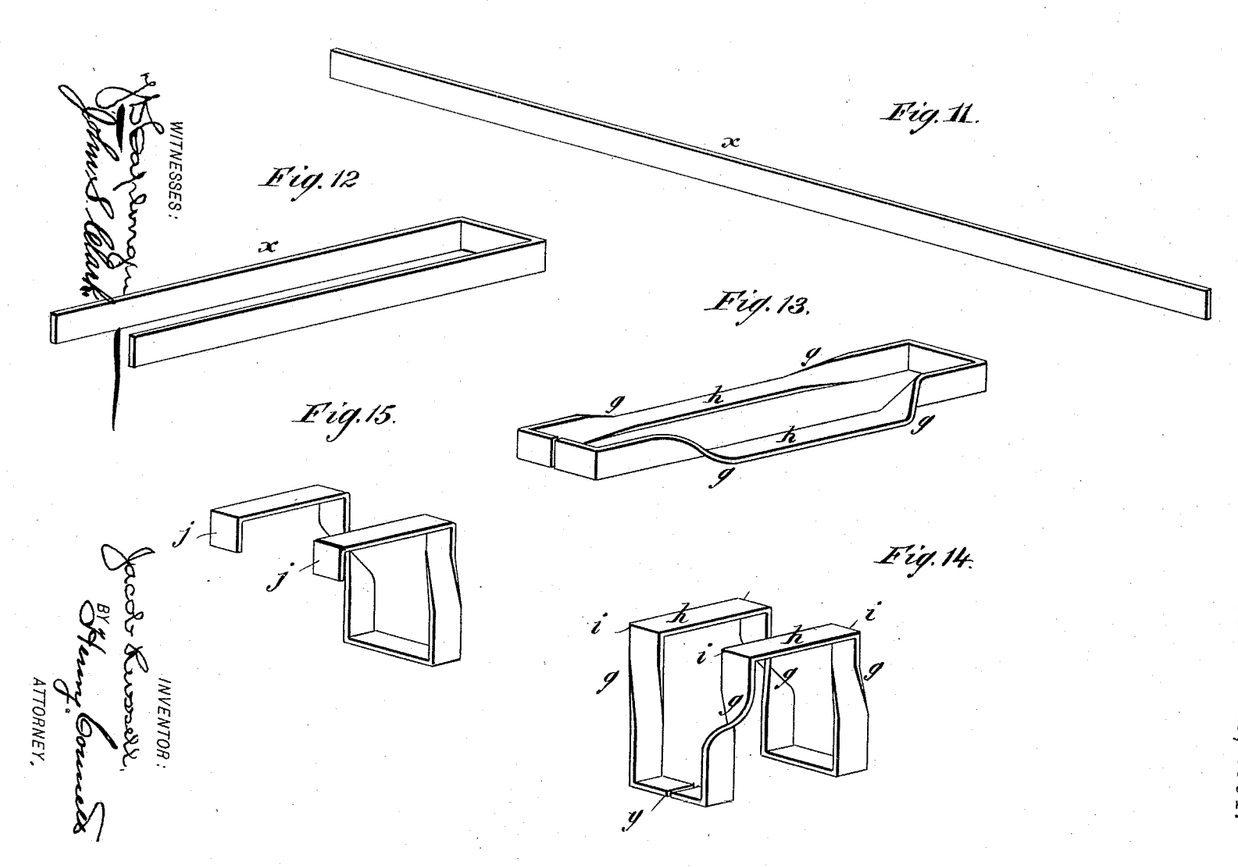
Figs. 11 to 15, inclusive, illustrate the product of the machine in its several stages.

In Fig. 15 one of these hangers is illustrated, and in Fig. 14 I have shown one of the double hangers as it comes from the machine.

In making these hangers flat bars of iron are usually employed, these bars (seen in Fig. 11) being cut to the proper length to make a complete hanger (see Fig. 14) when bent to shape by the mechanical devices embodied in the machine which I will now describe.

The general frame-work 1 of the machine, which will be by preference of cast-iron, is mounted on a bed-plate 2. The driving-shaft 3 is provided with a driving-pinion 4, which gears with two spur-wheels 5 and 6, secured, respectively, on two transverse shafts 7 and 8, rotatively mounted in the frame. On the shaft 8 are secured two bevel gear-wheels 9 and 10, which drive, respectively, two longitudinally-arranged shafts 11 and 12, through the medium of bevel gear-wheels 9' and 10'. On the shaft 8 are also secured spur-wheels 13 and 13', which gear, respectively, with similar wheels 14, 14' on a transverse cam-shaft 15, the latter shaft being thus driven from shaft 8. The above comprise all the rotating shafts and their connecting-gears.

Figure 1:
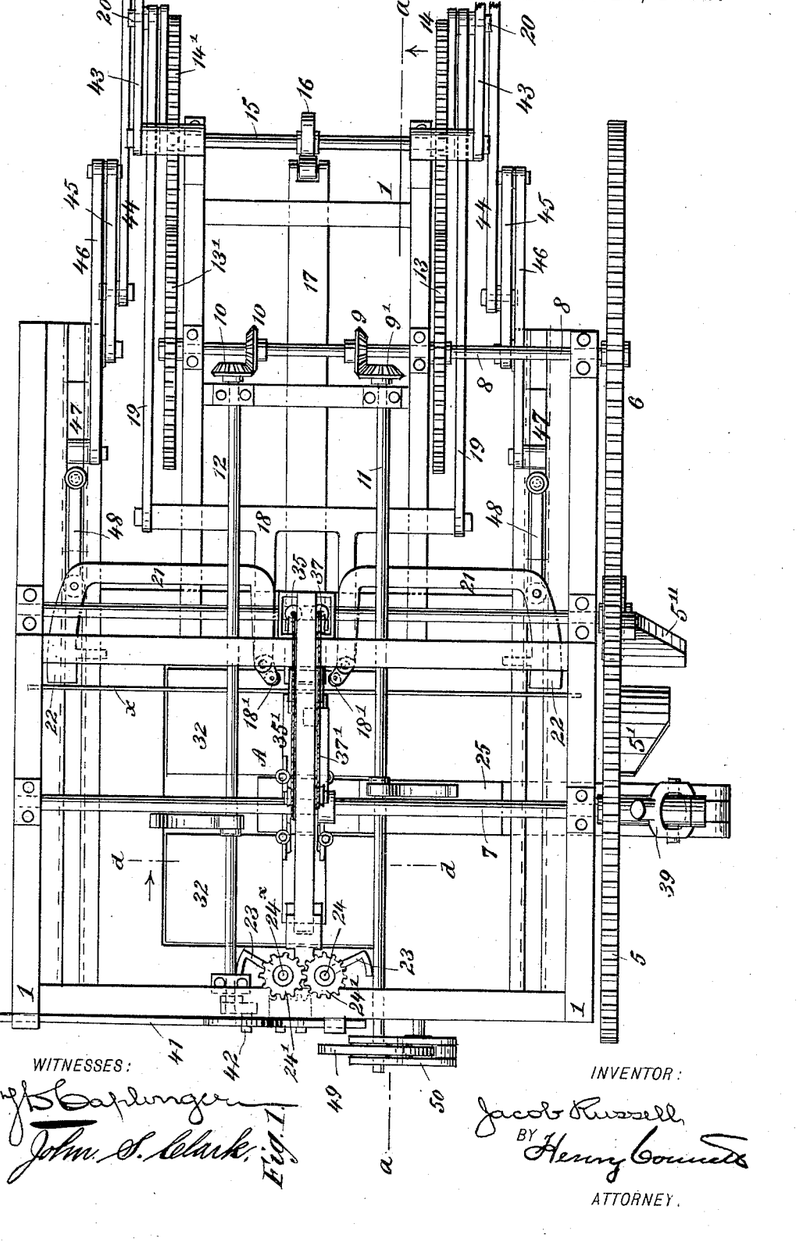
Figure 1 is a plan view of a machine embodying my improvements.
Figure 5:
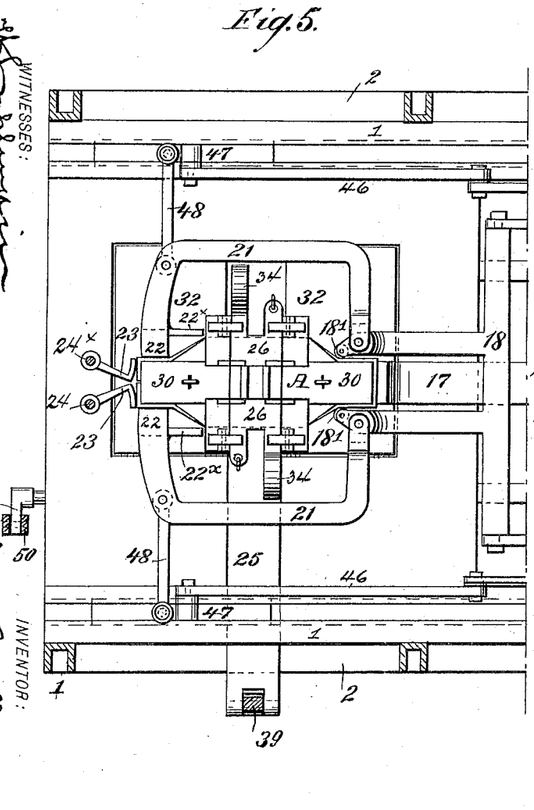
Fig. 5 is a sectional plan view of the front part of the machine, the plane of the section being indicated by the line $b\,b$ in Fig. 4.
Figure 6:
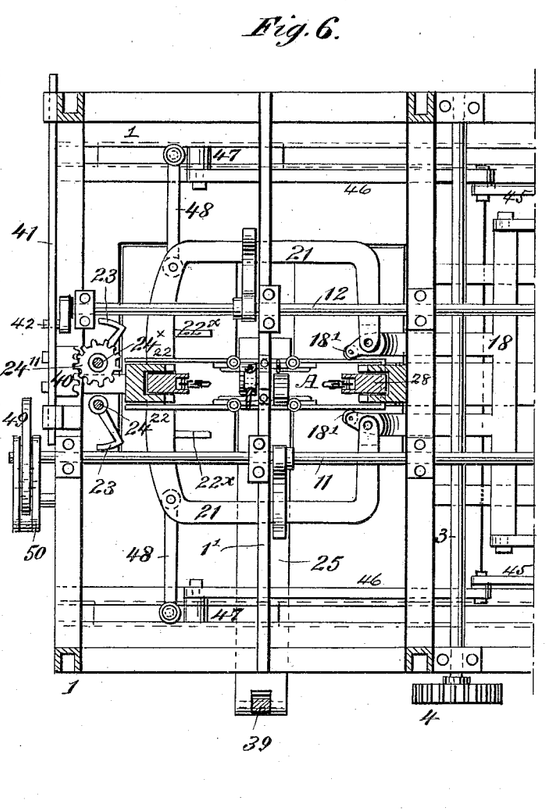
Fig. 6 is a sectional plan view of the front part of the machine, the plane of the section being indicated by the line $c\,c$ in Fig. 3.

The machine operates in a general way as follows: A heated bar of iron $x$ is placed by the attendant in position on supports, as seen in Fig. 1, and the machine set in motion. The bar $x$ rests on its edge and extends transversely of the machine. A cam 16 on the shaft 15 acts on a clamping-slide 17, which takes against the back of the bar $x$ at its middle and forces it up and clamps it firmly against the end of an upper die, which is represented as a whole by the letter A. This die is fixed securely at its upper side to a cross-bar of the main frame 1. Extending over the clamping-slide 17 is a sliding frame 18, bearing two rollers 18'. This frame is coupled by slotted links 19 to wrists or crank-pins 20 on the crank-wheels 14 and 14'. After the slide 17 has pressed the bar $x$ up firmly against the end of the die A the links 19 cause the frame 18 to advance, and the rollers 18' thereon strike the bar $x$ at two points and bend its end portions around the die until they lie flat against the longer sides of the same. Simultaneously with the forward movement of the sliding frame 18 two bent jaws or arms 21, hinged at one end in the frame 18 and bearing at their other ends jaw-heads 22, are swung around in a horizontal plane and made to clamp the branches of the bent bar $x$ firmly to the sides of the die A. Fig. 1 shows the parts in the position they occupy just before the bending begins, and Fig. 6 shows the position of the same when the jaw-heads 22 have clamped the end portions of the bar $x$ against the sides of the die A. The bar now has the form seen in Fig. 12. The moment these clamping devices are firmly set two toes 23 on parallel upright rock-shafts 24 and $24^\times$ are brought inward toward one another by the rocking of said shafts and bend inward the projecting extremities of the bar $x$ until they meet on the end of the elongated die A. The bar $x$ has now the form of an oblong rectangular link or band which closely embraces the die A. This band rests on a transversely-sliding lower die 25, which is moved in under and out from under the upper die A by means of cams 5' and 5'' on the spur-wheel 5. While the toes 23 are bending in the two extremities of the bar, as seen in Fig. 5, the two side portions of the bar are twisted and bent down flat by means of hinged flaps or twisters 26, which are let into and form parts of the sides of the die A. These twisters are depressed simultaneously by two like cams 27 on the two longitudinal shafts 11 and 12. The twisters act on those portions of the bar at the sides of die A which are embraced between the jaw-heads 22 and the rollers 18', and they turn these portions over and down upon the lower sliding die 25. When these twists have been effected, the toes 23, frame 18, jaws 21, and slide 17 are retracted, the frame 18 carrying with it the rollers 18', and at the same time while the cams 27 are still holding down the twisters 26 a vertically-arranged slide 28 over the upper die A descends, and two depressors 29 on said slide impinge upon the upper faces of the ends of die A. These end portions 30 (see Figs. 8, 9, and 10) of the die are hinged to the central body portion 31 and rest upon a hinged support 32, and at the moment the depressors act this support falls and these depressors force down the end portions of the upper die, and thus bend the ends of the partially-formed hanger down over the respective edges of the lower sliding die 25. The slide 28 is at once retracted, the cams 27 pass, and the end portions 30 of the die A and the twisters 26 are retracted through the medium of cords and weights or like means. Simultaneously, also, the lower die 25 is retracted by its cam, and the timber-hanger thus made is left suspended on a fixed support 33, connected with and forming part of the frame of the machine, and from which support it may be removed with tongs in a well-known way.

The double timber-hanger as it comes from the machine is seen in perspective in Fig. 14. To complete it, it is only necessary to weld together the extremities at the point $y$ in said figure.

I will now describe more minutely the mechanical details embodied in the machine.

Figure 3:
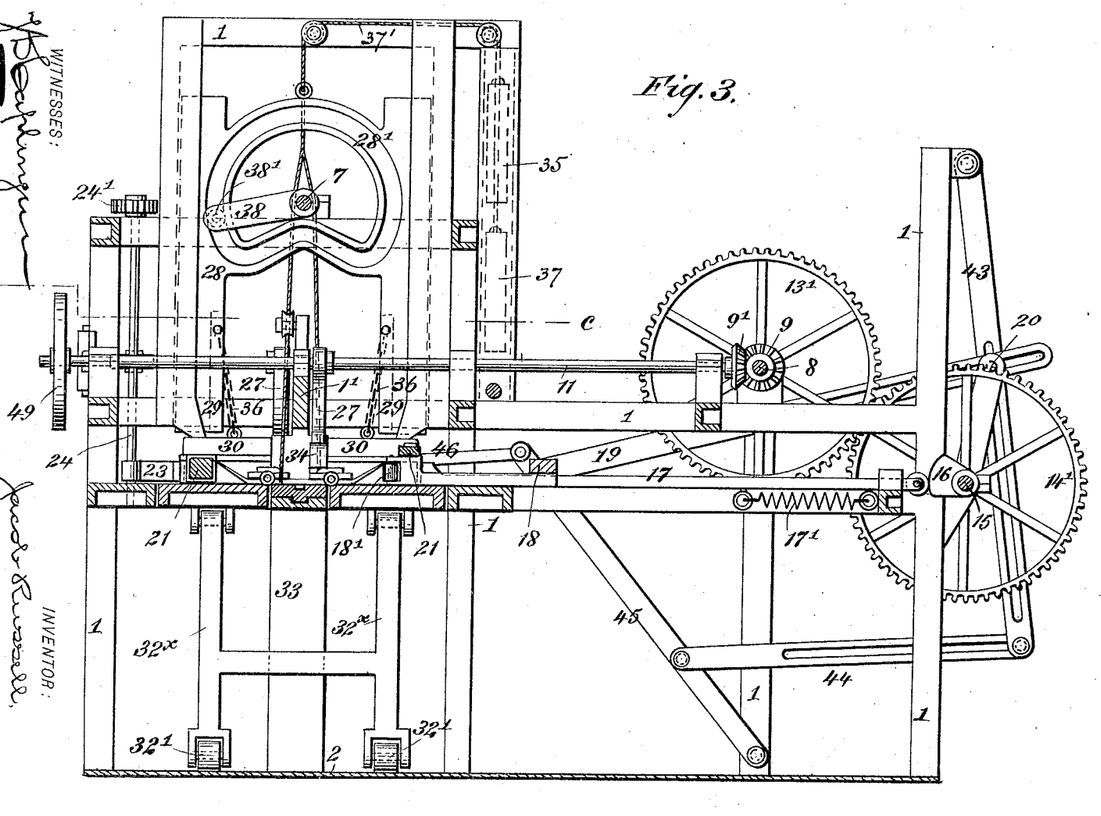
Fig. 3 is a longitudinal vertical section taken substantially in the plane indicated by the line $a\,a$ in Fig. 1.
Figure 8:
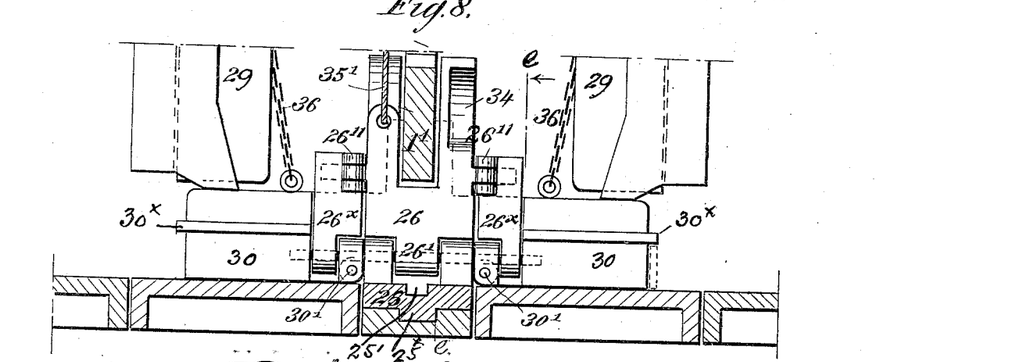
Figs. 8, 9, and 10 are detail views on a scale double that of the principal figures, illustrating the construction and operation of the dies.
Figure 9:
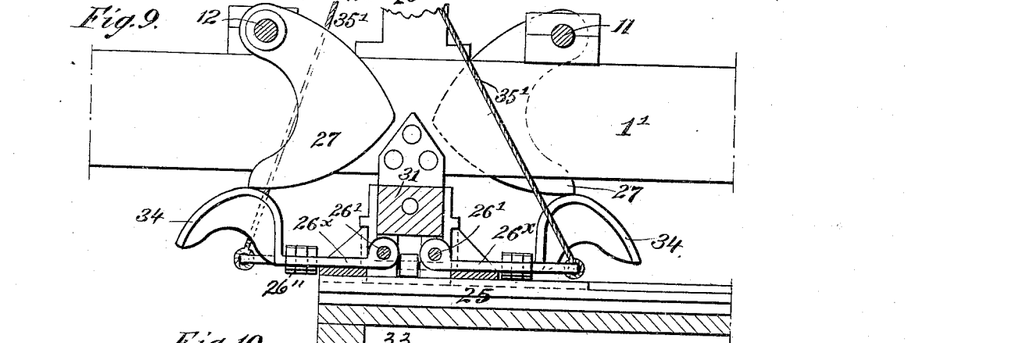
Figure 10:
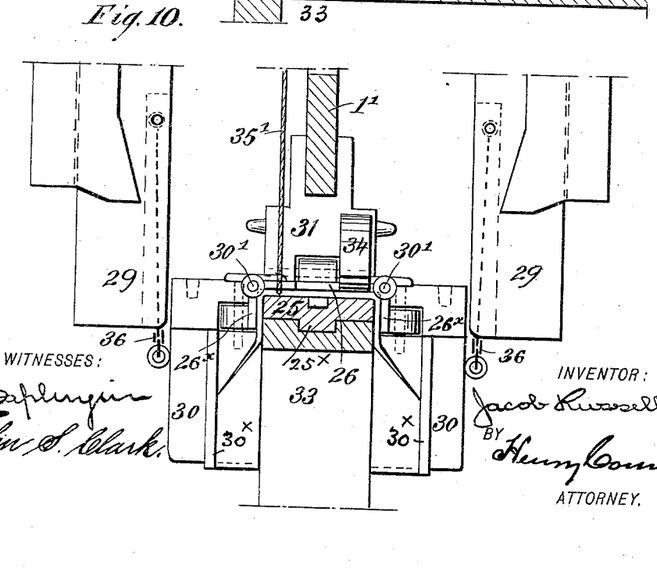

The upper die A is illustrated in the detail views, Figs. 8, 9, and 10, Fig. 8 being a side view with the flaps closed, Fig. 9 a transverse section on line $e\ e$ in Fig. 8, and Fig. 10 a side view with the ends and flaps depressed. The die comprises the central fixed portion or body 31, the two end portions 30 thereof, and the two side flaps or twisters 26. The end portions 30 are hinged at 30' to the body 31 at their lower edges, so that they may be depressed or turned down on said hinges, and the twisters 26 are hinged at 26' to the said body and end portions, so that they may be turned down on said hinges; but one important and peculiar feature about the die A is the construction of the twister 26. Each twister comprises a main or middle portion hinged to the body 31 and two end flaps $26^\times$, which are hinged to the respective end portions 30 of the die, and also to the respective ends of the main portion of the twister by hinges 26'', the axes of which are at right angles to that of the hinge 26'. The construction of this die, as above described, is such that when the several hinged parts are folded up to the body, as seen in Fig. 8, the whole has an oblong rectangular form in plan. The end portions 30 cannot be depressed until the twisters 26 shall have been depressed or turned down, and the end portions $26^\times$ of the twisters are turned or folded down, first in one direction by the movement of the twisters and then in the other direction by the depression of the end portions 30. The twisters in their movement produce the twists $g$ in the hanger, (see Figs. 13 and 14) and the end portions $26^\times$ bend the flattened intermediate portions $h$ of the hanger down over the edges of the lower die 25 and produce the bends or angles $i$ therein. The twisters 26 are provided with rounded lugs 34 for the respective actuating-cams 27 to impinge upon, and the twisters are retracted when the cams pass by a weight 35, connected with them by cords 35'. The end portions 30 of the die A are retracted by means of cords or chains 36, which connect them with the vertical slide 28. This slide will be provided with a counter-weight 37, connected to the slide by a chain or cord 37'. The slide 28 is actuated by a crank 38 (see Fig. 3) on shaft 7, which has a crank-pin 38', which engages a cam-groove 28', of the proper shape, in the face of said slide.

Figures 4, 7:
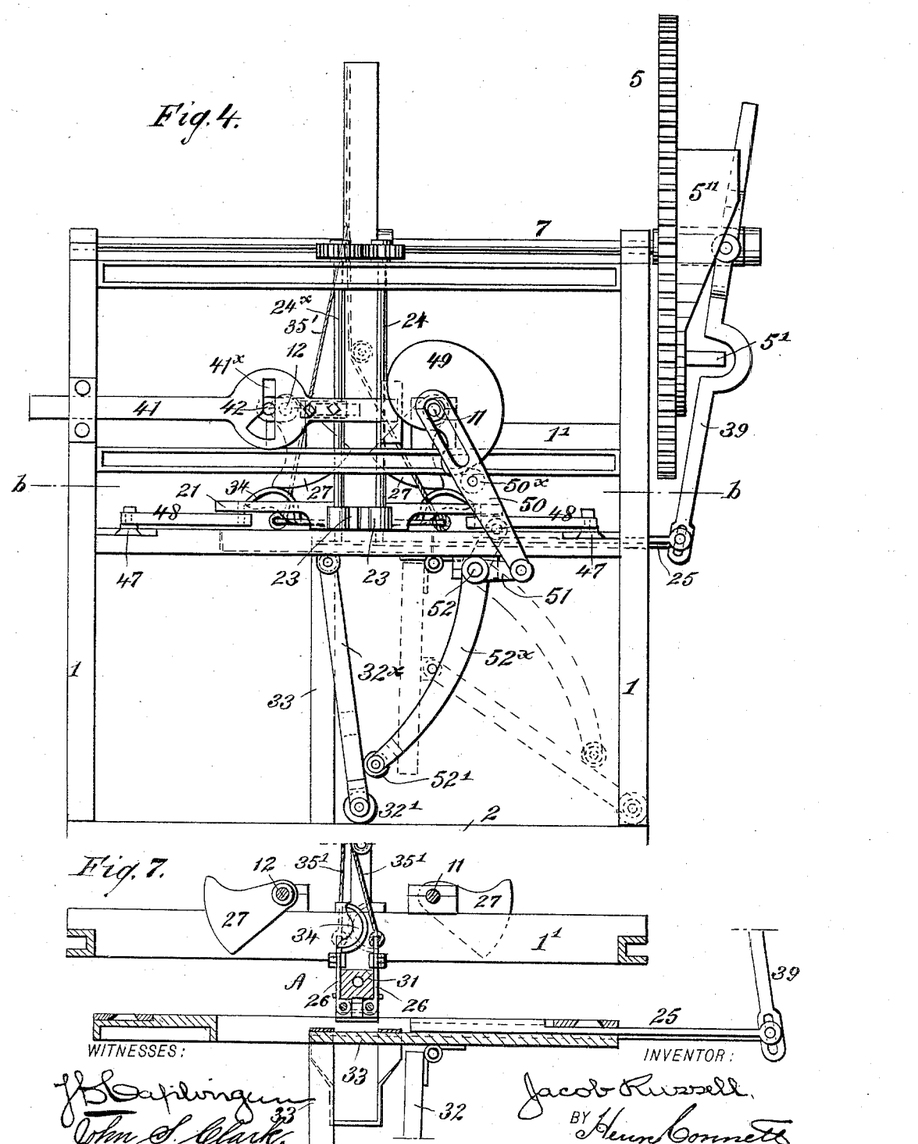
Fig. 4 is a front elevation of the machine.
Fig. 7 is a transverse vertical section taken in the plane indicated by line $d\,d$ in Fig. 1.

The lower die 25 is actuated by a cam-lever 39, (see Fig. 4,) fulcrumed on the shaft 7, and vibrated by the cams 5' and 5'' on the wheel 5 when the latter rotates.

Fig. 10 illustrates the manner of mounting the reciprocating lower die in its support and how it is locked to the upper die, so as to steady and strengthen the latter during the bending operation. The die 25 has a longitudinal tongue $25^x$ on its lower face, which engages a grooved way in the die-support 33, and the body 31 of the upper die has a transversely-arranged tongue 25' on its lower face, which engages a corresponding longitudinal groove in the upper face of the reciprocating lower die 25. The die 25 is in place under the upper die when the rollers 18' begin to bend the bar, and this engagement between the two dies gives to the upper die a steady bearing at its bottom or lower part, which enables it to resist the tendency toward endwise movement during the bending operation.

In order to insure the depression of the bent bar with the end portions 30 of the upper die A when said end portions are depressed, I provide these portions of the die with flanges $30^x$, (best seen in Figs. 8 and 10,) which project out over the top of the bent bar and force it down.

The bending-toes 23, fixed, respectively, on the upright shafts 24 and $24^x$, are actuated by the following described means: On these shafts are pinions 24', which gear them together, and on shaft 24 is a pinion 24", (see Fig. 6,) which gears with a rack 40 on a sliding rack-bar 41. In this rack-bar is a cam-shaped slot $41^x$, which is engaged by a crank-pin 42 on the longitudinal shaft 12. This crank-pin imparts the necessary longitudinal movement to the rack-bar, and this bar in turn imparts the necessary rocking movements to the upright shafts bearing the toes 23.

Figure 2:
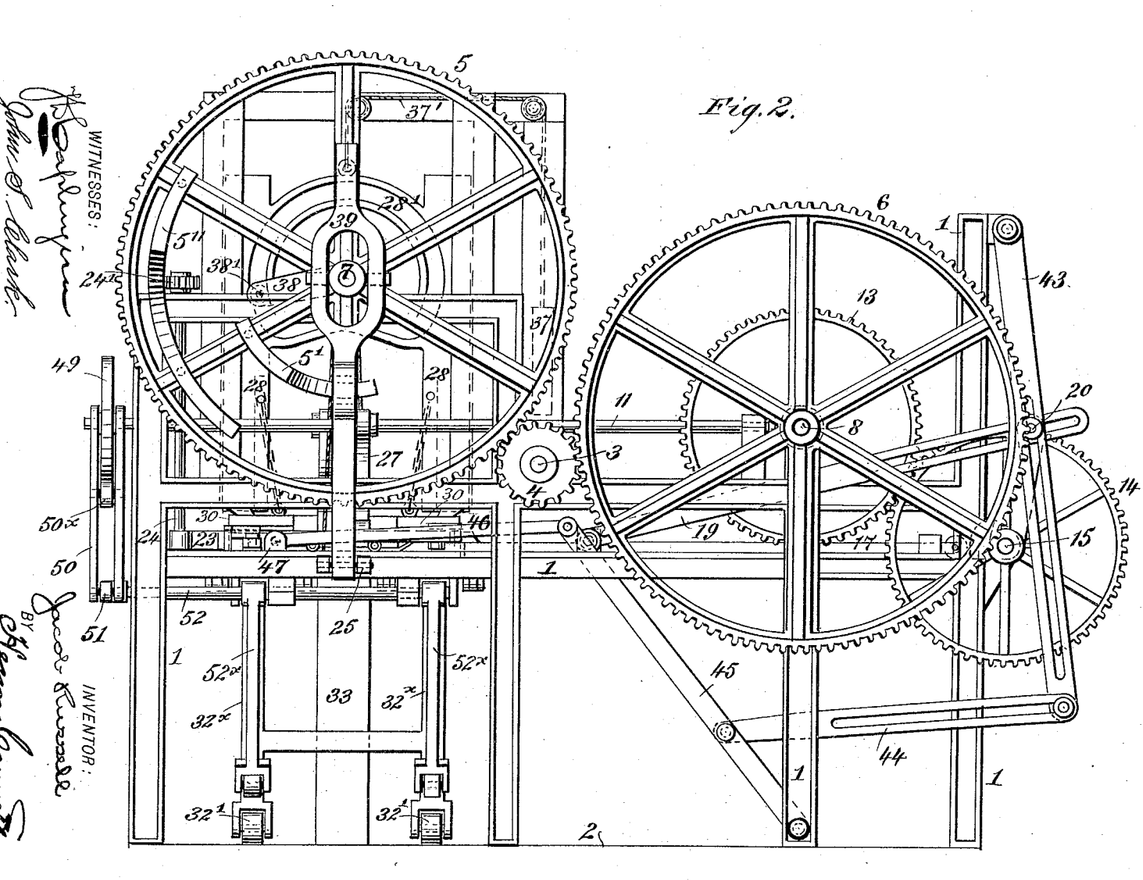
Fig. 2 is a side elevation of the same.

The movements of the pair of jaws 21 are effected by sets of slotted links and levers in the manner that I will now describe. As the jaws are actuated by like mechanisms through the medium, respectively, of the crank-pins 20 on the crank-wheels 14 and $14^x$, I will only describe that by which one of said jaws is actuated, referring especially to Figs. 1 and 2.

A slotted link 43 is pivotally connected to the frame 1 at its upper end, the crank-pin 20 on wheel 14 engaging the slot therein. At its lower end this link is coupled to a slotted link 44 by a pin which engages the slot in said link 44. The link 44 is coupled at its front end to a lever 45, which is pivotally attached to the frame 1 at its lower end, and is coupled at its upper end by a link 46 to a slide 47, mounted in a longitudinally-arranged horizontal slideway in the main frame. Continuous rotation of the crank-wheel 14 imparts an intermittent and irregular reciprocating motion to the slide 47. The slots in the links 43 and 44 are of the proper length to permit the wheel 14 to make a partial rotation without moving slide 47. This slide is coupled to the jaw 21 by a link 48, whereby when said slide is moved in one direction it closes said jaw and when moved in the opposite direction it retracts the jaw. When the jaw is closed on the bent bar, this link 48 acts as a toggle, as seen in Figs. 5 and 6, the line of pressure passing longitudinally through said link and through the coupling-points at its extremities. Thus the jaw is held pressed up against the bar about the die by a toggle behind it, the strain being borne by the slide 47 and the pressure being transversely thereof.

When the hot bar $x$ is placed upon its supports, resting upon its edge, and the machine is set in motion, the clamping-slide 17 moves up to the bar simultaneously with the elevation of the hinged support 32. I will now describe the mechanism which operates this support. To the under side of said support is hinged a prop $32^x$, in the lower free end of which is a roller 32', which rolls on the bed-plate 2. On the longitudinal shaft 11 is secured a cam 49, (see Fig. 4,) which acts on a slide-link 50, coupled to a crank 51 on a rock-shaft 52, whereby said shaft is rocked. On said rock-shaft 52 is an arm $52^x$, bearing at its extremity a roller 52', which impinges and rolls on the prop $32^x$ and presses the latter into an upright and nearly-vertical position under the support 32, thus raising the latter into its elevated position under the upper die A. When the vertical slide 28 descends, the cam 49 passes the roller $50^x$, on which it bears, and the pressure exerted by the slide 28, together with its weight, causes the support 32 to fall.

I have referred to the support 32 as a single element or feature; but owing to the intervention of the fixed support 33 under the lower die 25 I find it convenient to divide this hinged support into two parts or halves, and in consequence of this division I employ and show two connected props $32^x$, one under each division of said hinged support, and also two arms $52^x$ on the shaft 52 to bear on the respective props.

I have described the operation of the machine when double timber-hangers are being made. When single hangers—such as that represented in Fig. 15—are to be made, the movements of the machine are the same; but the heads of the jaws 21 and the bending-toes 23 produce no useful effect, as the bar employed is short. In order to keep the sides of the bent bar up close to the die A at their lower edges while the twisters are operating, I provide the jaws 21, near the heads thereof, each with a laterally-projecting flange or lug $22^x$, which is situated far enough back from the face of the jaw-head to allow the iron bar $x$ to lie flat between the said lug and the side of the die A. This lug does not project out quite to the twister, thus leaving room for the latter to turn down flat. When the twister acts on the bar, the tendency is to push the unclamped or free end of the bar bodily away from the die A, but the bar will be checked by the lug $22^x$, and as the bar is twisted its lower edge will be thrown inward toward the die A by reason of its upper edge bearing against the inner face of the said lug as the twisting is going on. When the twisting has been effected, the free ends of the bar—namely, the extremities lettered $j$ in Fig. 15—will lie flat between the respective lugs $22^x$ and the sides of the die A. In the after process these extremities will be bent down, as seen in Fig. 15, and the single hanger will be completed and left suspended on the fixed support 33. I will say here that this support, which is substantially a part of the machine-frame and has the same width as the lower die 25, does not extend entirely across the frame. This permits the finished hanger to be slipped off from its end instead of being lifted off.

I do not wish to restrict myself to the proportions of the frame-work and mechanisms herein shown, as these may be varied to suit the work to be done and will be within the knowledge of any skilled machinist; nor do I limit myself to the precise construction of the mechanisms shown, as this may be varied somewhat without materially departing from my invention.

Having thus described my invention, I claim—

1. In a metal-bending machine, the die A, comprising the body secured to the frame at its upper part, end portions 30, hinged to said body at their lower edges, and two side flaps or twisters, said flaps each comprising a central portion hinged to the body at its lower edge, and two end portions 26$^\times$, said portions being hinged at their lower edges to the respective end portions of the die and at their sides to the ends of the middle or main portion of the twister, substantially as set forth.

2. In a metal-bending machine, the combination, with the fixed upper die having end portions and hinged and depressible side flaps or twisters, of means, substantially as described, for depressing and elevating said end portions and twisters, the reciprocating lower die and its support, and the falling supports under said end portions of the die, all arranged to operate substantially as set forth.

3. In a metal-bending machine, the combination, with the upper die having a fixed body 31 and hinged end portions 30, of the reciprocating lower die 25, arranged under the upper die, the reciprocating slide 28, provided with depressors 29 for depressing said end portions, and connectors 36, uniting the said end portions of the die and their respective depressors, substantially as set forth.

4. In a metal-bending machine, the combination, with the upper die A, secured to the machine-frame at its upper part and provided with a tongue 25', of the reciprocating lower die 25, mounted in guides and adapted to slide under and transversely of the said die A, said lower die having a groove which engages the tongue on the upper die, substantially as and for the purposes set forth.

5. In a metal-bending machine, the combination, with the fixed upper die, of the reciprocating clamping-slide for holding the bar to the die, the reciprocating rollers for effecting the primary bends, the reciprocating side clamps or jaws for holding the branches of the bar up to the die, and the rocking or vibrating toes for bending the extremities of the bar up to the die, whereby the bar is given the form of an oblong link embracing the die.

6. In a metal-bending machine, the combination, with the fixed upper die, of the hinged jaws 21, having heads 22, which clamp the bar to the die, the slides 47, mounted in guideways in the machine-frame, the links 48, which couple the said slides to the respective jaws, and means for reciprocating said slides, whereby the said links are made to serve as toggles behind the jaw-heads, as set forth.

7. In a metal-bending machine, the combination, with the upper die, of the mechanism for bending the extremities of the bar toward one another at the end of said die, said mechanism comprising the toes 23, their shafts, the gear-wheels on said shafts, and the mechanism, substantially as described, whereby said shafts are rocked in opposite directions.

8. In a machine for bending metal, the combination, with the fixed upper die, the reciprocating lower die which plays under the upper die, and the support for said lower die, of the falling support 32 under said upper die, the hinged strut 32$^\times$ under said support, the rock-shaft 52, means, substantially as described, for rocking said shaft, and the roller-bearing arm 52$^\times$ on said shaft, the roller on said arm bearing on said strut, as set forth.

9. The combination, with the die 25, mounted to slide in guides, of the shaft 7, the wheel 5 thereon, the cams 5' and 5'', mounted on the side of said wheel, and the lever 39, fulcrumed on the shaft 7 and coupled at its lower end to said die 25, all arranged to operate substantially as set forth.

10. The combination, with the upright rock-shafts 24 and 24$^\times$, the toothed wheels on same that gear them together, and the toes 23 on said shafts, of the gear-wheel 24'' on one of said shafts, the sliding rack 40, gearing with wheel 24'', the rack-bar 41, provided with a cam-slot 41$^\times$, the rotating shaft 12, and the crank-pin 42, carried by said shaft and engaging said slot, substantially as set forth.

11. The combination, with the hinged jaw 21, of the mechanism for imparting a reciprocating movement to the same, said mechanism comprising a crank-wheel 14, having a crank-pin 20, the slotted arm 43, attached to the frame at its upper end and said crank-pin engaging its slot, the slotted link 44, coupled by its slot to arm 43 and at its other end to a lever 45, said lever 45 coupled at its lower end to the frame, the slide 47, mounted in a slideway in the frame, the link 46, connecting said slide with the upper end of the lever 45, and the link 48, coupling the slide 47 to the jaw 21, all arranged to operate substantially as set forth.

12. In a machine for bending timber-hangers, the combination, with the die A, having hinged end portions and side flaps or twisters, and mechanism for depressing and elevating said end portions and twisters, of the
5 reciprocating jaws 21, provided with lugs $22^\times$, respectively, substantially as and for the purposes set forth.

In witness whereof I have hereunto signed my name in the presence of two subscribing witnesses.

JACOB RUSSELL.

Witnesses:
HENRY CONNETT,
J. D. CAPLINGER.